(12) United States Patent
Blackwelder (10) Patent No.: US 7,934,897 B1
(45) Date of Patent: May 3, 2011

(54) TRUCK APPARATUS COUPLEABLE TO DIFFERENT BODY TYPES AND METHODS OF INTERCHANGING THE BODIES

(76) Inventor: Paul E. Blackwelder, Laurel, NC (US)

(*) Notice: Subject to any disclaimer, the term of this patent is extended or adjusted under 35 U.S.C. 154(b) by 1024 days.

(21) Appl. No.: 11/508,590

(22) Filed: Aug. 22, 2006

Related U.S. Application Data (60) Provisional application No. 60/710,254, filed on Aug. 22, 2005.

(51) Int. Cl.
*B60P 1/16* (2006.01)
(52) U.S. Cl. .................. 414/373; 298/1 A; 298/17 T
(58) Field of Classification Search .............. 298/1 A, 298/17 T, 22 R; 296/35.3; 414/498, 373; 410/80, 81; 280/DIG. 8
See application file for complete search history.

(56) References Cited

U.S. PATENT DOCUMENTS

| | | | |
|---|---|---|---|
| 6,390,742 B1 * | 5/2002 | Breeden | 410/77 |
| 6,733,027 B2 | 5/2004 | Stragier et al. | |
| 6,877,757 B2 | 4/2005 | Hayworth | |
| 6,908,093 B1 | 6/2005 | Putnam | |
| 7,357,457 B2 * | 4/2008 | Thomas | 298/1 A |

* cited by examiner

*Primary Examiner* — Stephen Gordon
(74) *Attorney, Agent, or Firm* — Everman Law Firm, PA; Gregory R. Everman (57) ABSTRACT

An apparatus and method for coupling different body types to a truck, specifically interchanging between dump and trailer bodies, so that a single truck may be used to perform dump truck and tractor truck operations. The truck includes a pair of rearward extending frame rails and a mounting bracket to which a $5^{th}$ wheel may be releaseably attached. The truck is adapted for carrying at least one of a $5^{th}$ wheel and a hydraulic lift system and, thus, is capable of being coupled to a trailer body or dump body, respectively. The truck is changed over from having a dump body to a trailer body by lifting the dump body with its hydraulic cylinder; attaching a hoist to a dump body; lifting the dump body with a hoist; removing at least part of the weight of the hydraulic cylinder from the truck; detaching the hydraulic cylinder from the truck; removing at least part of the weight of the dump body from a coupling pin holding the dump body to the truck; removing the coupling pin; positioning a $5^{th}$ wheel onto mounting brackets; securing the $5^{th}$ wheel to the mounting brackets; and coupling a trailer body to the $5^{th}$ wheel. The method may be reversed in order to change over the truck from carrying a trailer body to a dump body.

2 Claims, 8 Drawing Sheets

Fig. 9 though the 5$^{th}$ wheel is

TRUCK APPARATUS COUPLEABLE TO DIFFERENT BODY TYPES AND METHODS OF INTERCHANGING THE BODIES

CROSS REFERENCE TO RELATED APPLICATIONS

This application claims the benefit of U.S. Provisional Application No. 60/710,254, filed Aug. 22, 2005, which is hereby incorporated by reference.

BACKGROUND OF THE INVENTION

1. Field of the Invention

The present invention relates generally to the field of vehicles for hauling materials and, more specifically, to an apparatus and method for coupling different body types to a truck.

2. Description of the Related Art

Dump trucks and tractor trucks have different hauling bodies for accomplishing different purposes. A dump truck includes a towing engine that is coupled to a hydraulically operated open-box (dump) body that is hinged at the rear. The front of the body can be raised to allow the contents (usually gravel or some type of soil for construction) to be discharged by gravity on the ground behind the truck at the site of delivery.

In contrast, a tractor truck is an articulated truck consisting of a towing engine (tractor) and a trailer body that carries the freight. The trailer remains generally in the same plane as the truck during unloading, which is usually performed by fork lifts.

It is desirous for trucking operations to have trucks with both types of dedicated bodies in order to provide a greater variety of services. However, dump trucks and tractor trucks are costly, each ranging from $90,000 to substantially more. Moreover, each truck requires separate permits, insurance, maintenance and other associated costs. And oftentimes, particularly for smaller operations, only one type of truck is being utilized for a project while the other remains idle. The high cost of a truck and limitations of the dedicated bodies can restrict a trucking operation's ability to expand into different services or cause the trucking operation to risk financial strain in order to expand.

Accordingly, what is needed in the art of vehicles for hauling materials is a truck that can be coupled to different body types in order to expand the utility of the truck and lower overall operations costs. Also needed in the art is for the truck to be interchangeably attachable to a dump body and trailer body, depending of the desired use. Further needed in the art is for the body changeover to be accomplishable by a single person within a short period of time, such as 15 minutes or less.

BRIEF SUMMARY OF THE INVENTION

To achieve the foregoing and other objects, the present invention, as embodied and broadly described herein, provides various embodiments of a truck adapted for interchangeably coupling different bodies thereto, and methods of interchanging the bodies, in order to enhance the trucks utility.

In a preferred embodiment of the present invention, the truck apparatus is adapted for being interchangeably coupled to a dump body and a trailer body and includes a truck having frame rails; mounting brackets attached to the frame rails; a 5$^{th}$ wheel having a mounting platform and adapted for being attached to the mounting bracket, wherein the 5$^{th}$ wheel is capable of being coupled to the trailer body; and a hydraulic cylinder adapted for being attached to the truck and the dump body. The truck includes a dump body hinged at the rear by a pin and a hydraulic system for raising the front of the body to allow the contents to be discharged by gravity.

In a preferred embodiment of the present invention, a method is provided for interchanging a dump body and trailer body on a truck and includes the steps of removing the dump body from the truck and attaching the trailer body to the truck. Additional steps include lifting the dump body with a hydraulic cylinder; attaching a hoist system to the dump body; removing at least part of the weight of the hydraulic cylinder from the truck; detaching the hydraulic cylinder from the truck; removing at least part of the weight of the dump body from a coupling pin; removing the coupling pin from the dump body and the truck; positioning a 5$^{th}$ wheel onto mounting brackets; releaseably attaching the 5$^{th}$ wheel to the mounting brackets; and coupling a trailer body to the 5$^{th}$ wheel.

In a preferred method of the present invention, the steps of the method may be reversed in order to remove the trailer body and attach a dump body.

BRIEF DESCRIPTION OF THE DRAWINGS

The above described and other features, aspects, and advantages of the present invention are better understood when the following detailed description of the invention is read with reference to the accompanying drawings, wherein.

DETAILED DESCRIPTION OF THE INVENTION

The present invention will now be described more fully hereinafter with reference to the accompanying drawings in which preferred embodiments of the invention are shown. This invention may, however, be embodied in many different forms and should not be construed as limited to the embodiments set forth herein. These exemplary embodiments are provided so that this disclosure will be both thorough and complete, and will fully convey the scope of the invention to those skilled in the art.

The present invention is a vehicle for hauling material and, more specifically, a truck apparatus coupleable to different body types and methods for attaching and interchanging the bodies. In various embodiments, the truck includes a $5^{th}$ wheel to which a trailer body may be attached or a hydraulic lift system for attaching a dump body. In other embodiments, the truck may include both a $5^{th}$ wheel and a hydraulic lift system.

In various methods of the invention, the truck is converted between having a trailer body and a dump body. In various methods, a hoist system is utilized to remove the dump body and position the $5^{th}$ wheel for coupling by the trailer body. In various methods, the hoist system is utilized to remove the $5^{th}$ wheel and place the dump body on the truck.

Figure 1:
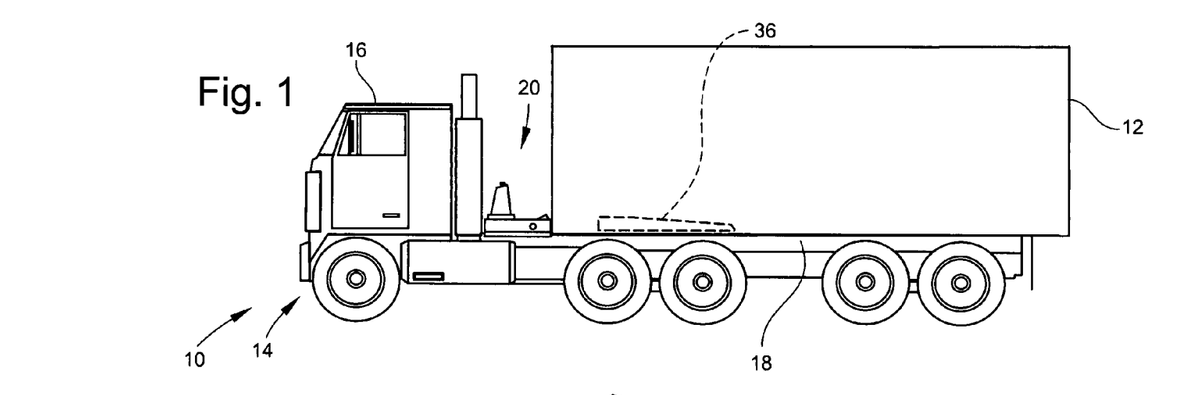
FIG. 1 is a side view of the invented truck apparatus configured as a semi-tractor truck, having a 5$^{th}$ wheel mounted thereto for coupling with a trailer body, in accordance with an embodiment of the present invention.
Figure 2:
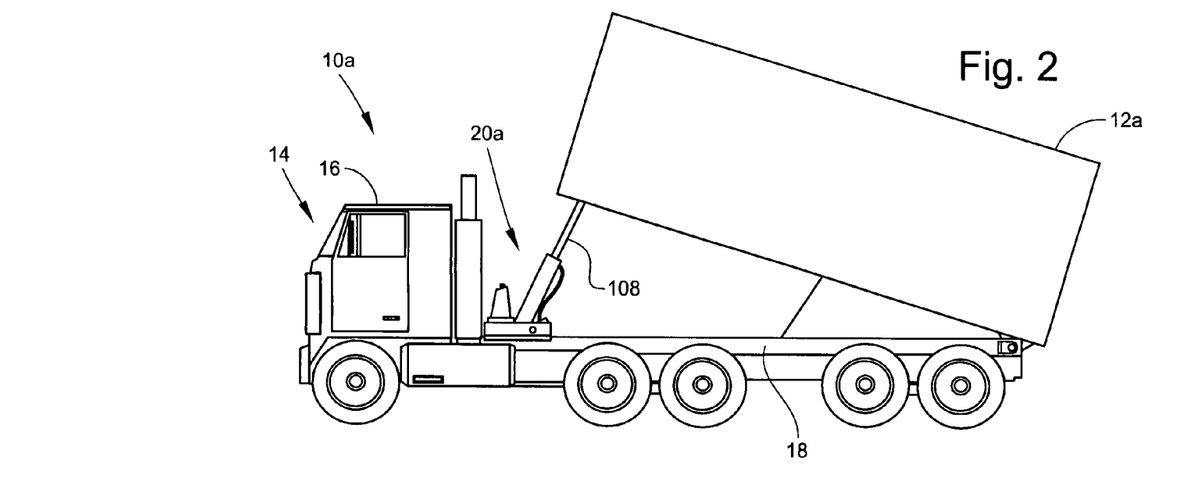
FIG. 2 is a side view of the invented truck apparatus configured as a dump truck, having a hydraulic lift system for actuating a dump body, in accordance with an embodiment of the present invention.

Referring now to the drawings, FIG. 1 illustrates an embodiment of a truck 10 configured for hauling a trailer body 12, in accordance with the present invention. FIG. 2 illustrates an embodiment wherein the truck 10 of FIG. 1 has been converted into a dump truck 10a having a dump body 12a, in accordance with the present invention. Methods are described herein wherein the trailer body 12 (FIG. 1) and dump body 12a (FIG. 2) may be interchanged.

Referring to FIGS. 1 and 2, the illustrated embodiments the truck 10, 10a include a tractor 14 comprising a cab 16, a chassis with a pair of rearward extending frame rails 18, a front axle and at least one rear axle, and a hydraulic lift system 20, 20a for operation of the dump body 12a when the truck is being utilized as a dump truck 10a. It is to be understood that the basic components of the truck are the same regardless whether the truck is being used with a trailer body 12 or dump body 12a.

Figure 3:
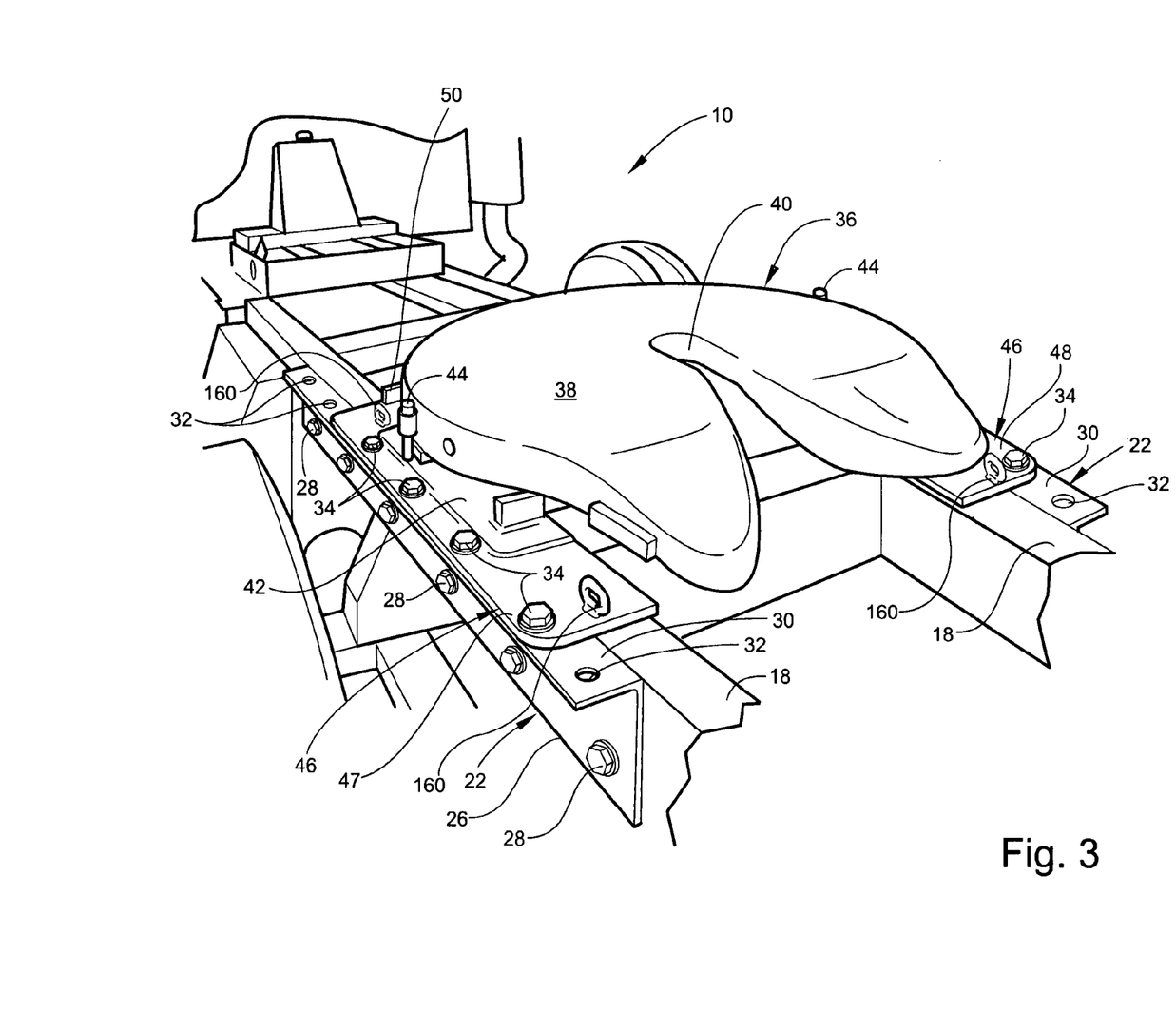
FIG. 3 is a perspective view the invented truck apparatus, having a 5$^{th}$ wheel mounted thereon for coupling to a trailer body as shown in FIG. 1, in accordance with an embodiment of the present invention.

Referring to the embodiment illustrated by FIG. 3, a mounting bracket 22 is attached to each of the frame rails 18. Each of the mounting brackets 22 are L-shaped with a downward extending section 26 being attached by bolts 28 to the side of the frame rails 18 and a lateral section 30 having a planar top surface that is essentially on the same plane as the top surface of the frame rails 18. The lateral sections 30 include a plurality of openings 32 through which bolts 34 are received to releaseably attach a $5^{th}$ wheel 36 to the truck 10.

The $5^{th}$ wheel 36 comprises a king pin plate 38 having a jaw slot 40 for coupling to a trailer body 12 (see FIG. 1) in a conventional manner. The king pin plate 38 is secured to left and right mounts 42 by a pair of pins 44, the mounts 42 being secured to a mounting platform 46 by any suitable means, for example by welding, as illustrated. The mounting platform 46 has left and right sections 47, 48 joined by a forward cross member 50. The left and right sections 47, 48 each have a planar bottom surface that rests atop the respective left and right frame rails 18 and lateral sections 30.

Preferably, the lateral sections 30 have a length greater than that of the mounting platform 46 so that the openings 32 therein allow for the $5^{th}$ wheel 36 to be positioned further forward or rearward on the truck 10 depending on the load being carried. That is, the $5^{th}$ wheel 36 may detached and moved forward or rearward to any location where the $5^{th}$ wheel openings and mounting platform openings 32 can be coaxially aligned and secured thereat by bolts 34. In an alternative embodiment, pins may be used in place of bolts 34 in order to simplify detachment of the $5^{th}$ wheel 36 from the truck 10 when converting the truck between the trailer body 12 (FIG. 1) and dump body 12a (FIG. 2).

Figure 4:
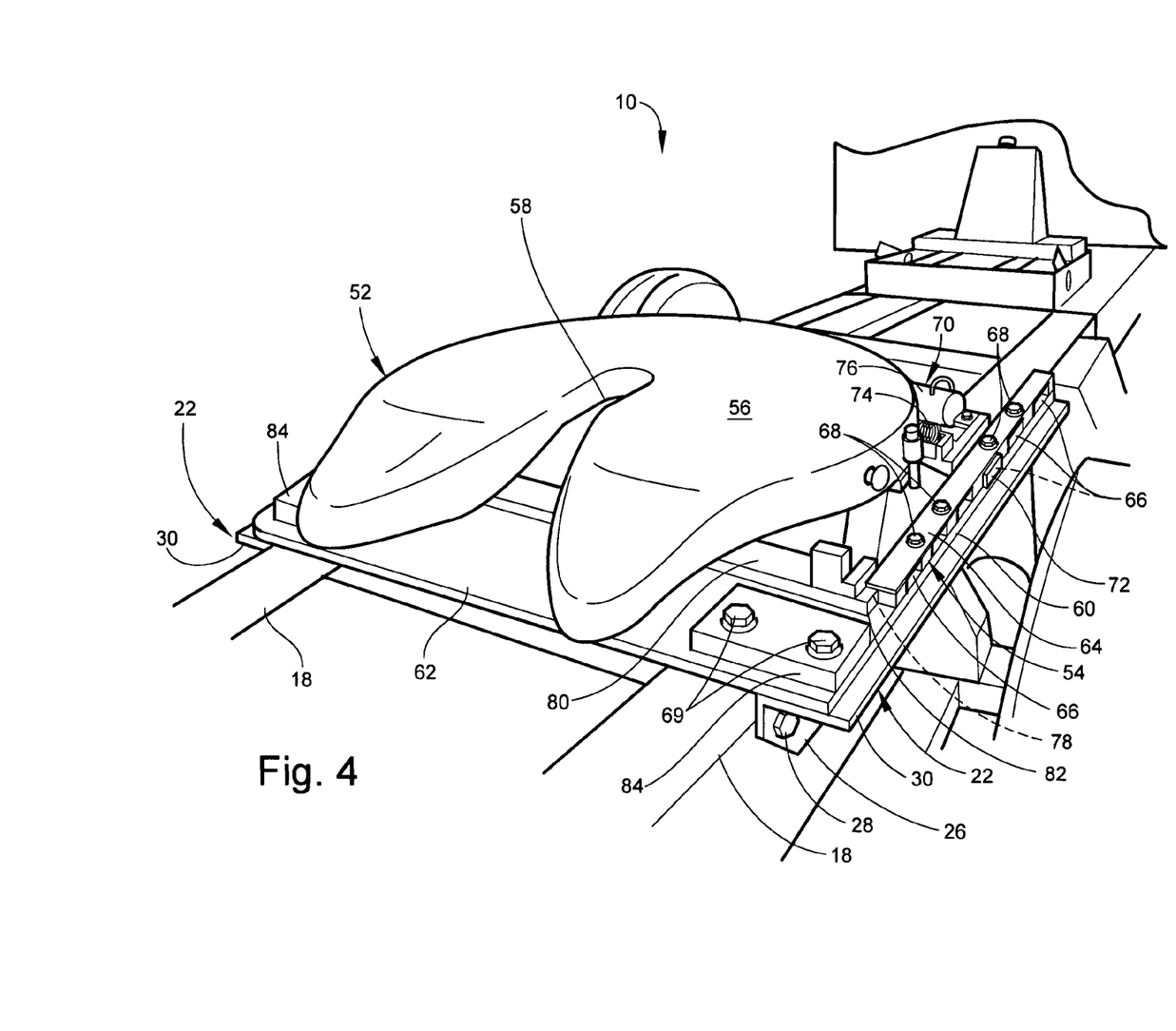
FIG. 4 is a perspective view the invented truck apparatus, having a slidable 5$^{th}$ wheel mounted thereon for coupling to a trailer body, in accordance with an embodiment of the present invention.

In another embodiment, illustrated by FIG. 4, the present invention includes the same or similar truck components as previously described, but utilizes a slidable $5^{th}$ wheel 52 instead of the previously described $5^{th}$ wheel, and a mounting platform 54 that is suitable for use with the slidable $5^{th}$ wheel 52. That is, the truck 10 includes frame rails 18, left and right L-shaped mounting brackets 22 each having a downward extending section 26 being attached by bolts 28 to the sides of the frame rails 18 and a lateral section 30 having a planar top surface that is essentially on the same plane as the top surface of the frame rails 18. The lateral sections 30 are provided with a plurality of openings through which bolts 68 are received to releasebly attach the mounting platform 54, which ultimately secures the slidable $5^{th}$ wheel 52, to the truck 10.

The slidable $5^{th}$ wheel 52 includes a king pin plate 56 having a jaw slot 58 for coupling a trailer body 12 (FIG. 1) to a truck 10. Advantageously, the slidable $5^{th}$ wheel 52 can be adjusted forward or rearward to allow the coupling point between the truck 10 and trailer 12 (FIG. 1) to be changed, in accordance with the load being carried, without having to disengage the mounting platform 54 from the truck 10, as was required in the embodiment illustrated by FIG. 1.

The mounting platform 54 includes substantially identical left and right sections 60 (only the right section is principally shown) joined by a forward cross member (not illustrated) and a rearward cross members 62. The left and right sections 60 each have a planar bottom surface that rests atop respective left and right frame rails 18 and lateral sections 30. Left and right adjustment rails 64 are positioned atop the mounting platform sections 60 and are provided with a plurality of spaced adjustment slots 66 which provide selectable positions at which the slidable $5^{th}$ wheel 52 may be secured. Concentric through-openings in the adjustment rails 64, mounting platform sections 60 and mounting bracket 30 receive bolts 68, or other means such as pins, to releaseable secure the components together. As such, the adjustment rails 64 and slidable $5^{th}$ wheel 52 may be removed from the frame rails 18 by removing the fastening bolts 68. Similarly, the mounting platform 54 may also be removed by removing additional bolts 69.

A conventional hydraulic locking assembly 70 is provided to secure the slidable $5^{th}$ wheel 52 in a predetermined position, and also to release the $5^{th}$ wheel 52 from its locked position to enable the $5^{th}$ wheel 52 to be moved to a new desired position. The locking assembly 70 includes substantially similar left and right locking blocks 72 (only the right side is shown) that are biased into adjustment slots 66 by springs 74 (partially shown) whereat the locking blocks 72 secure the $5^{th}$ wheel 52 from moving in any direction relative to the truck frame 18. To move the $5^{th}$ wheel 52 to a new position, a hydraulic cylinder 76 articulates a linkage of lever arms (not shown) to overcome the biasing springs 74 in order to withdrawal and release the locking blocks 72 from respective slots 66. Thusly, the $5^{th}$ wheel 52 is no longer locked in a fixed position and may be relocated forward or rearward to a new position.

In the event that the locking assembly 70 fails, additional safety measures are provided to keep the trailer body (FIG. 1) from inadvertently detaching from the truck 10. For example, the $5^{th}$ wheel 52 is provided with left and right lateral flanges (not shown) that are received within respective left and right inward facing lower channels 78 (only right channel is shown) provided in the inward facing surfaces of the adjustment rails 64. The lateral flanges may be moved forward and rearward within the channels 78, however vertical movement is restricted by the adjustment rails 64. Thus, the slidable 5$^{th}$ wheel 52, and ultimately the trailer body 12 (FIG. 1), is restricted from vertically separating from the frame rail 18.

Additionally, a rear stop member 80 is provided to limit rearward movement of the slidable 5$^{th}$ wheel 52 in case the locking assembly 70 fails. The stop member 80 includes left and right flanges 82 (only the right flange is shown) that are slidably received within the adjustment rail lower channels 78, which restricts the stop member 80 for vertically separating from the truck 10. Additionally, rearward movement of the stop member 80 is controlled by a pair of plates 84 secured to the mounting platform 54 by bolts 69.

In each of the embodiments, the truck 10, 10a is equipped with necessary hydraulic and electrically lines (not shown) in order to operate the truck 10, 10a when carrying either the dump body 12a (FIG. 2) or trailer body 12 (FIG. 1). Common components include air lines to operate the slidable 5$^{th}$ wheel 52, air brakes, and dump bed tail gate; hydraulic lines to lift the dump bed; and electrical lines for vehicle/body lights and signals.

Figure 5:
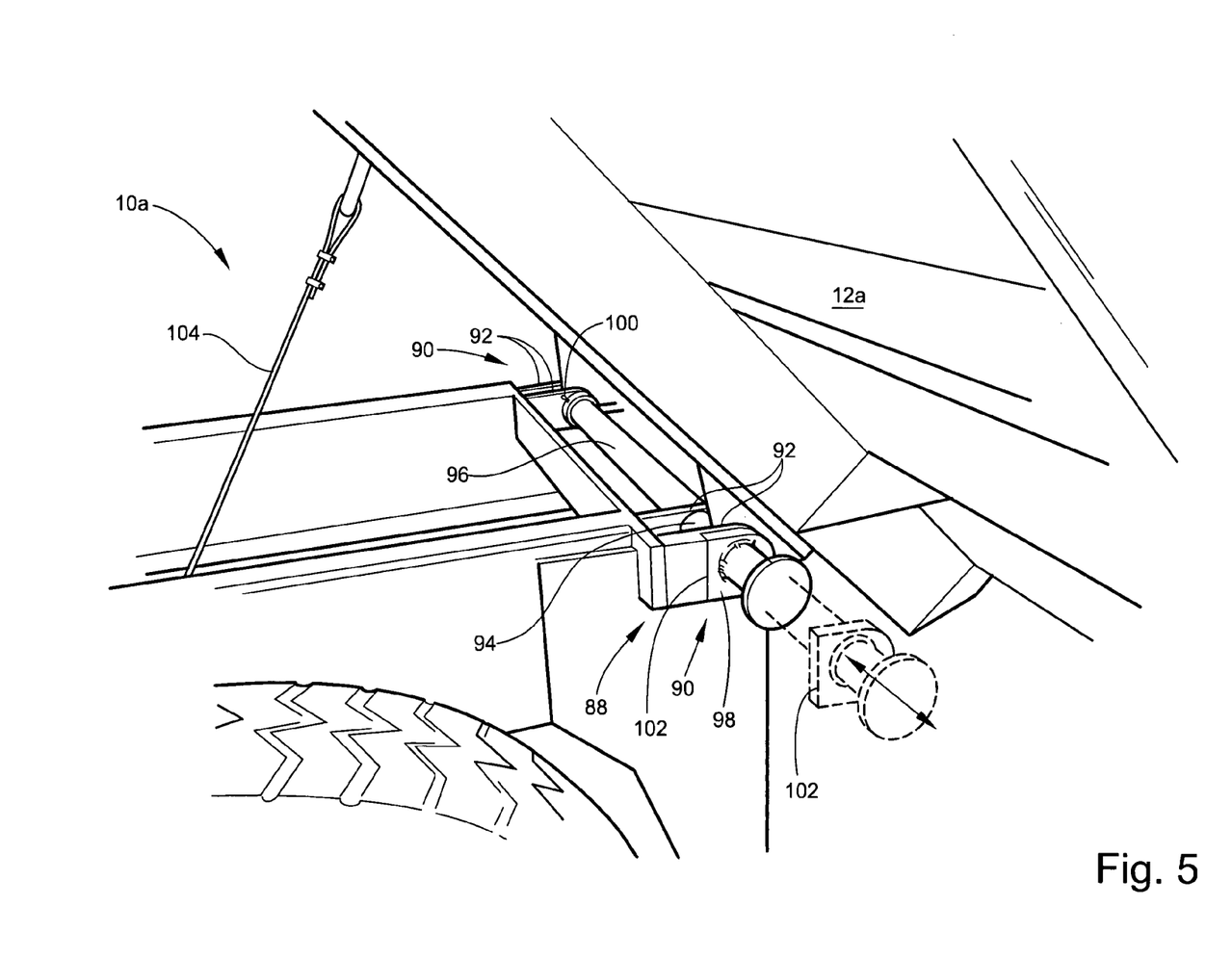
FIG. 5 is a perspective view of a hinge assembly of the invented truck apparatus of FIG. 2, for pivotally attaching a dump body to the truck apparatus.

Referring to FIG. 5, the truck 10a is equipped with rearwardly disposed hinge assembly 88 for pivotally attaching the dump body 12a. The hinge assembly 88 includes a pair of brackets 90 connected at the rear of the truck 10a. Each bracket 90 includes laterally spaced plates 92 at which coupling collars 94 of the dump body 12a are disposed. A laterally disposed coupling pin 96 is received through coaxial openings in the brackets 90 and collars 94 thereby rotatably joining the dump body 12a to the truck 10a.

The coupling pin 96 is releaseably secured in place by having an enlarged section 98 at one end of the coupling pin 96 and a securing pin (not shown) inserted through the coupling pin 96 at the opposed end such that the securing pin and enlarged section 98 limit lateral movement of the coupling pin 96. Optionally, a secondary securing pin 100 may be provided through both the bracket 90 and coupling pin 96 in order to further ensure that the coupling pin 96 does not unexpectedly separate from the truck 10a.

The coupling pin 96 may further include an alignment portion 102 to assist in properly aligning the coaxial openings in the bracket 90 and coupling pin 96 through which the secondary securing pin 100 is inserted when attaching the dump body 12a to the truck 10a. The exemplary illustrated alignment portion 102 includes a linear edge that abuts a linear edge of the bracket 90. Proper alignment of the openings for inserting the secondary pin 100 occurs when the two linear edges are abutted and the coupling pin's enlarged section 98 is engaged against the bracket 90.

Air and electrical lines provide for proper operation of the truck and bodies and include quick disconnect couplings as needed to convert between the body types 12, 12a (FIGS. 1 and 2). Additionally, a stop cable 104 is attached at one end to the truck 10a and at the opposed end to the dump body 12a to limit the lifting range of the dump body 12a for safety considerations.

Figure 6:
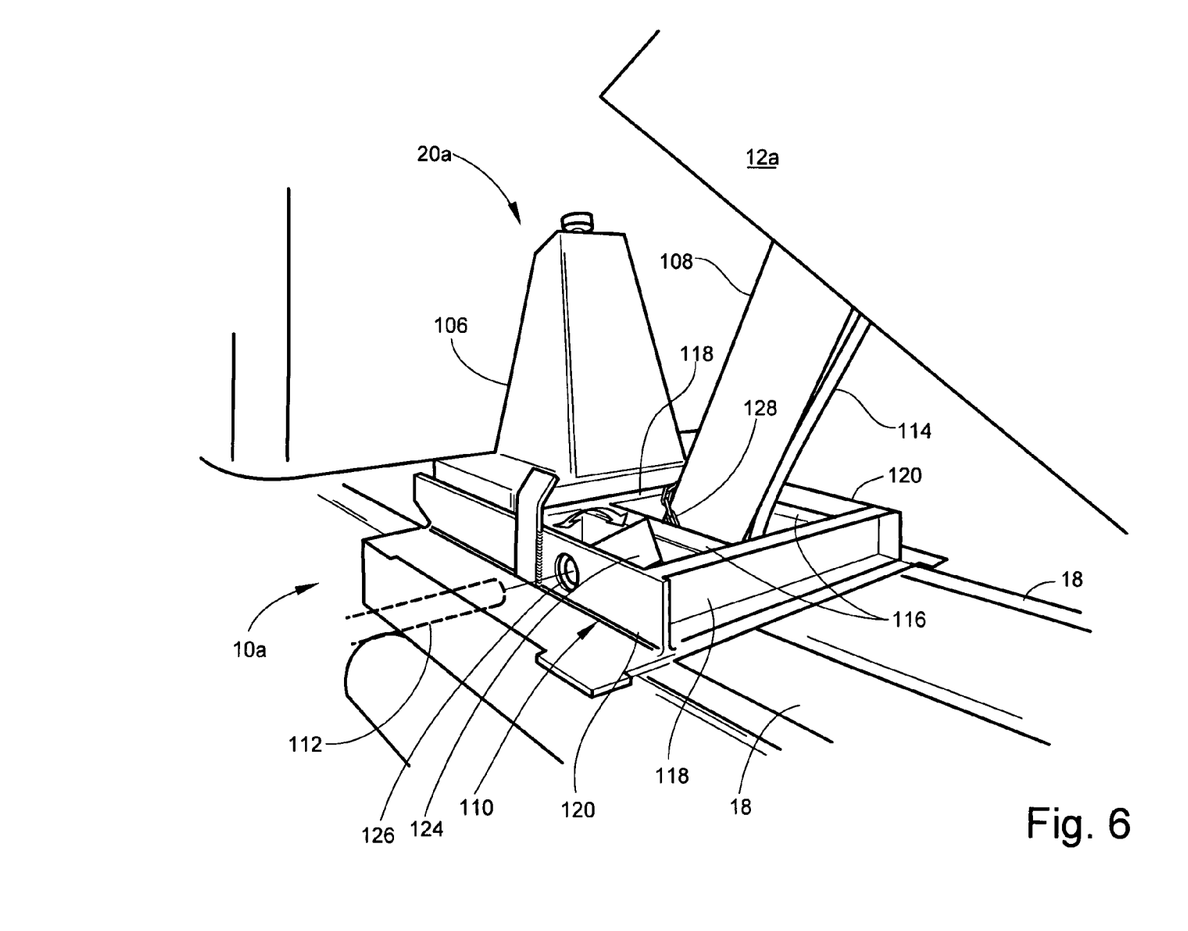
FIG. 6 is a perspective view of a hydraulic lift system of the invented truck apparatus of FIG. 2, for moving a dump body between hauling and dumping positions.

Referring to FIG. 6, the truck 10a includes the hydraulic lift system 20a for lifting the front of the dump body 12a so that material is discharged by gravity out of the dump body's rear gate. The hydraulic lift system 20a comprises a hydraulic tank 106 for storing fluid and a hydraulic cylinder 108 rotatably attached to the dump body 12a by a distal pin (not shown) and rotatably attached to the truck 10a at a cradle 110 by a proximal pin 112. A hydraulic line 114 provides hydraulic fluid from the tank 106 to the hydraulic cylinder 108 and is equipped with a quick release coupling. Air and electrical lines (not shown) extending rearward from the cradle area 110, for operation of the tailgate and taillights are disposed at an elevation less than that of the frame rails 18 where they are protected against engagement by the body 12a.

The cradle 110 includes members 116 laterally spaced from the hydraulic cylinder 108 and cross members 118 joining the lateral members 116. The cross member 118 extend laterally beyond the lateral member 116, to which laterally positioned plates 120 are attached. While the cross and lateral members 118, 116 provide structural integrity, the lateral plates 120 serve to retain the proximal pin 112 that secures the hydraulic cylinder 108 to the cradle 100 and allows for its removal.

The proximal pin 112 is disposed through coaxial openings (not shown) in the laterally spaced members 116 and the hydraulic cylinder 108, thereby rotatably coupling the hydraulic cylinder 108 to the cradle 110. Lateral movement required to free the promixal pin 112 is restricted by the lateral plates 120 such that the pin 112 remains in proper operational position. To remove the proximal pin 112, a swing arm 124 is manually rotated about a pivot to a position that leaves an opening 126 in one of the plates 120 uncovered (FIG. 6 shows the swing arm 124 rotated to a position whereby the opening 126 is exposed). The opening 126 is aligned so that the proximal pin 112 (shown in phantom) may be passed there-through for egress out of the cradle 110. To maintain the proximal pin 112 in working position in the cradle, the swing arm 124 rotated to a position whereby it blocks the opening 126.

In the preferred embodiment, the hydraulic cylinder 108 is removed when the truck 10 is being used with a trailer body 12, as illustrated in FIG. 1. Referring to FIG. 6, to facilitated removal, the proximal end of the hydraulic cylinder 108 is also provided with a chain 128 or bracket that is used when lifting the hydraulic cylinder 108 out of the cradle 110. The process for interchanging the dump body and trailer body is described in greater detail further below.

In the aforementioned embodiments of the present invention, the hydraulic cylinder 108 must be in place and the 5$^{th}$ wheel removed in order for the truck 10a to carry the dump body 12a, as illustrated by FIG. 2. Conversely, the 5$^{th}$ wheel 36 must be in place and the hydraulic cylinder removed in order for the truck 10 to carry the trailer body 12, as illustrated by FIG. 1.

Notwithstanding, it is contemplated that the truck may be configured to allow for both the 5$^{th}$ wheel and hydraulic cylinder to remain intact regardless of whether the truck is being utilized with a dump body or trailer body. This embodiment (not illustrated) is essentially the same as the embodiments described above, however, the hydraulic cylinder is capable of being laid in a position that doesn't interfere with the trailer body and, likewise, the 5$^{th}$ wheel may be positioned so that it doesn't interfere with the dump body.

For example, the rearmost cross member of the cradle may be configured to have a cutout intermediate section so that the hydraulic cylinder may be laid essentially flat. Additionally, the 5$^{th}$ wheel may be located at a position above the laid-down hydraulic cylinder by having a heightened mounting or adjustment bracket. As the 5$^{th}$ wheel is sufficiently elevated above the hydraulic cylinder, the trailer body may be coupled to the 5$^{th}$ wheel without interfering with the hydraulic cylinder. Conversely, to attach the dump body without interfering with the 5$^{th}$ wheel, the hydraulic cylinder may be actuated into partially elevated positioned above the 5$^{th}$ wheel. The hinge coupling the dump body to the truck may be configured to accommodate the additional height necessary to clear the 5$^{th}$ wheel by having elongated brackets that space the dump body upwards from the frame rails.

Figure 7:
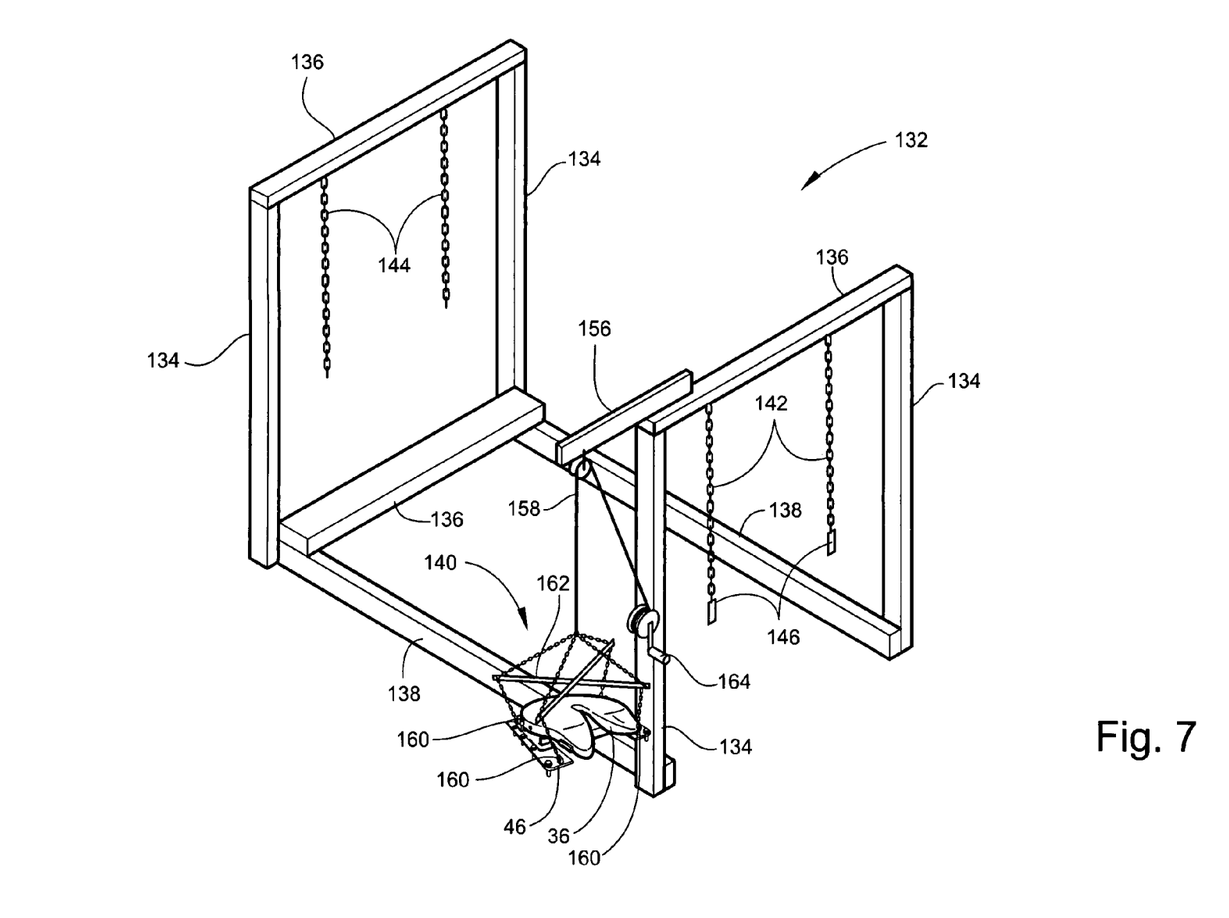
FIG. 7 is a perspective view of a hoist system for interchanging the invented truck apparatus with dump and trailer bodies.

Referring to the embodiments illustrated by FIGS. 1-6, a method is provided for interchangeably attaching the trailer body 12 (FIG. 1) and dump body 12a (FIG. 2) to the truck. As illustrated in FIG. 7, the method utilizes a hoist system 132 having four vertical corner posts 134, lateral and cross beams 136, 138 supporting the corner posts 134, a boom arm system 140 for lifting and positioning the 5$^{th}$ wheel 36, and a pair of forward and rearward chains 142, 144 used for lifting and positioning the dump body 12a (FIG. 8).

Figure 8:
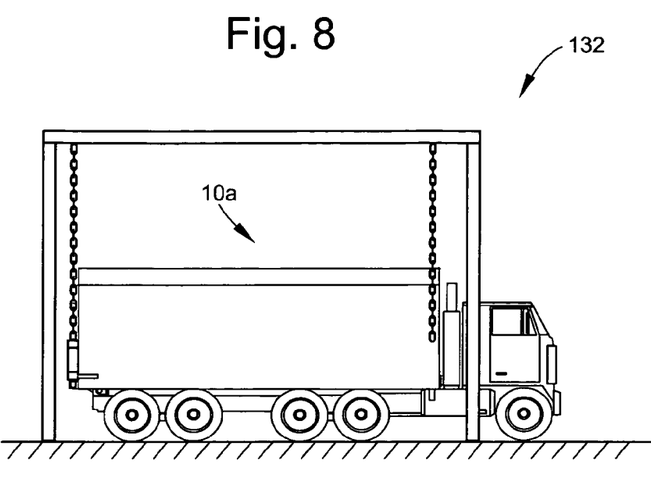
FIG. 8 is a side view of the hoist system of FIG. 7, showing the invented truck apparatus in position for removing the dump body.

In operation, to change-over the truck from using a dump body 12a to a trailer body 12, the truck 10a is driven into position within the hoist system 132, as illustrated by FIG. 8. Ground flags may be provided to aid the driver in laterally aligning the truck 10a and the lower rear cross beam 136 (FIG. 7) may be used as a rear stop.

Figure 9:
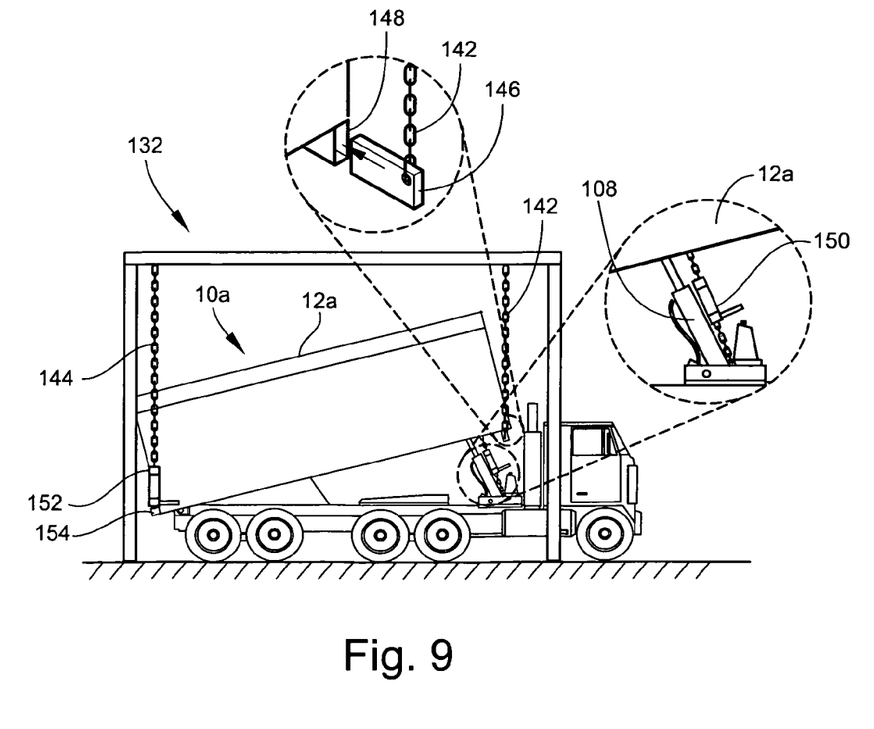
FIG. 9 is a side view of the hoist system of FIG. 7, showing the dump body in a lifted position for removal of the hydraulic cylinder from the truck apparatus.

Once the truck 12a is properly positioned, the hydraulic cylinder 108 is removed by first actuating the hydraulic cylinder 108 to lift the front of the dump body 12a to its maximum height whereat the hydraulic cylinder 108 is generally vertical, as shown in FIG. 9. Thereafter, the dump body 12a is fixed to the hoist system 132 by inserting bars 146 that are located at the ends of the front chains 142 into sleeves 148 affixed at the front corners of the dump body 12a. The front chains 142 are suitable for fully supporting the weight of the dump body 12a. The weight of the hydraulic cylinder 108 and dump body 12a is then removed from the hydraulic pin 112 (FIG. 6) by utilizing a hand wench 150 that is attached at one end to the bottom of the dump body 12a and at the other end to the chain 126 (see FIG. 6) at the bottom of the hydraulic cylinder 108 to lift the hydraulic cylinder 108 so that the hydraulic pin 112 may be freely moved. Referring to FIG. 6, the hydraulic pin 112 is then removed by pivoting the swing arm 126 thereby allowing for the hydraulic pin 112 to be manually removed through the opening 124 in the hydraulic cradle 110. By quick disconnecting the hydraulic line 114, the hydraulic cylinder 108 is detached from the truck 10a, being only connected to the dump body 12a.

The next step is to disconnect the dump body 12a from the truck 10a by first disconnecting the stop cable 104 from the dump body 12a, as illustrated by FIG. 5. The pins holding the coupling pin 96 may be removed at this time or just prior to removing the coupling pin 96. Air and electrics lines for the rear gates and rear lights are disconnected by a quick disconnect couplings. Referring to FIG. 9, thereafter the rear of the dump body 12a is attached to the hoist system 132 by connecting ratchets 152 between the rear chains 144 and brackets 154 affixed at the rear corners of the dump body 12a. The ratchets 152 are used to lift the dump body 12a in small increments until its weight is removed from the coupling pin 96 (FIG. 5) so that the pin 96 may be manually removed from engagement. The dump body 12a is now fully detached from the truck 10a and suspended by the hoist system 132, as illustrated by FIG. 10.

Figure 11:
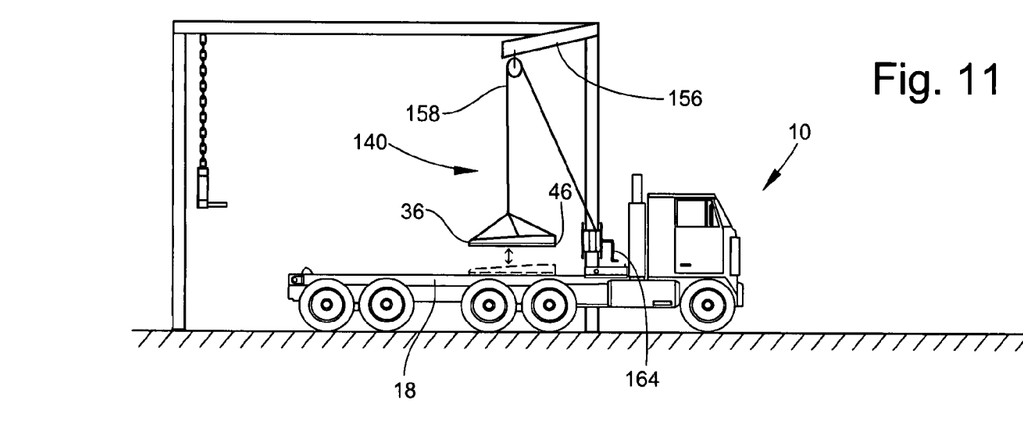
FIG. 11 is a side view of the hoist system of FIG. 7, showing the 5$^{th}$ wheel being positioned on the truck by a boom arm system for allowing attachment of a trailer body.

Referring to FIGS. 7 and 11, to install the trailer body 12 (FIG. 1) on the truck 10, the truck 10 is driven into position under a boom arm 156 of the boom arm system 140 where the 5$^{th}$ wheel 36 is being carried by a hoist chain 158. The hoist chain 158 holds the 5$^{th}$ wheel 36 at hooks 160 (see also FIG. 3) located at each corner of the mounting platform 46. A bracket 162 (FIG. 7) may be provided to space sections of the hoist chain 158 to facilitate connection to the mounting platform 46. The 5$^{th}$ wheel 36 is lowered by a crank 164 (FIG. 7) to a desired positioned (shown in phantom in FIG. 11) onto the truck rails 18 whereat the openings in the mounting platform 46 and openings 32 in the mounting brackets 22 are aligned, as illustrated in FIG. 3. Bolts 34 are inserted through the openings and fixed by nuts to secure the 5$^{th}$ wheel 36 in placed. The trailer body 12 may now be coupled to the truck 10 in a conventional manner, as illustrated in FIG. 1.

It is to be understood that the steps of this method may be reversed so that the trailer body 12 may be removed and a dump body 12a installed. That is, the trailer body 12 is uncoupled from the 5$^{th}$ wheel 36 in a conventional manner. Thereafter, the truck 10 is driven under the boom arm system 140 where the hoist chain 158 is attached to the hooks 160 (FIG. 7) in the 5$^{th}$ wheel mounting platform 46, as illustrated by FIG. 11. Referring to FIG. 3, bolts 34 are removed thereby releasing the mounting bracket 46 and thus the 5$^{th}$ wheel 36 from attachment to the truck 10. The boom arm system 140 is then used to lift the 5$^{th}$ wheel 36 from the truck 10, as illustrated by FIG. 11.

Figure 10:
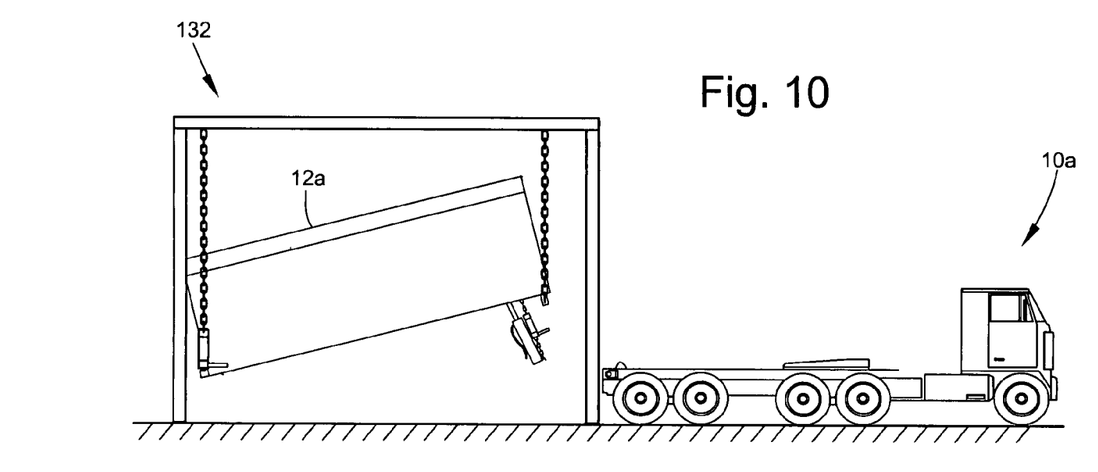
FIG. 10 is a side view of the hoist system of FIG. 7, showing the dump body suspended by the hoist system and separated from the truck.

Referring to FIG. 10, the truck 10 is then driven to a position within the hoist system 132 for installing the dump body 12a. The ratchets 152 are attached to the brackets 154 at the rear of the dump body 12a and are used to vertically adjust the dump body 12a so that the coupling pin 96 can be inserted within openings on the brackets 90 and collars 94 in order to pivotally join the dump body 12a to the truck 10a, as illustrated by FIG. 5. The alignment portion 102 of the coupling pin 96 is engaged against a linear edge of the bracket 90 so openings in the brackets 154 and coupling pin 96 align into which secondary pins 100 may be positioned to further secure the coupling pin 96. As the rear of the dump body 12a coupled to the truck 10a, the rearward chains 144 are removed from attachment and support of the dump body 12a.

Referring collectively to FIGS. 6 and 9, the hand wench 150 is used to position the hydraulic cylinder 108 for being secured to the cradle 110 by the proximal pin 112. Thereafter, the hand wench 150 is removed from attachment to the truck 10a. Also, as the hydraulic cylinder 108 now fully supports the front of the dump body 12a, the forward chains 142 are removed from attachment and support of the dump body 12. The dump body 12a is now fully attached to the truck 10a and the truck may be operated as a conventional dump truck.

Regardless of whether the dump body is being interchanged for the trailer body, or vice versa, the conversion process requires only one person and may be performed in about fifteen minutes. As such, the foregoing embodiments provide methods of interchanging different types of bodies on a truck, specifically a dump body and a trailer body, thereby allowing the truck to perform a wider variety of tasks. And, as the conversion process may be preformed by one person without much downtime, the truck body may be changed multiple times a day as needed.

The foregoing provides a detailed description of exemplary embodiments of the present invention. Although truck embodiments and methods of attaching different bodies thereto have been described with reference to preferred embodiments and examples thereof, other embodiments and examples may perform similar functions and/or achieve similar results. All such equivalent embodiments and examples are within the spirit and scope of the present invention and are intended to be covered by the following claims.

That which is claimed is:

1. A method for interchanging a dump body and trailer body on a truck, including the steps of:
   lifting the dump body with a hydraulic cylinder;
   attaching a hoist system to the dump body;
   lifting the dump body with the hoist system whereby at least part of a weight of the hydraulic cylinder bearing on the truck is removed;

removing remaining weight of the hydraulic cylinder bearing on the truck such that a mechanical coupling that pivotally attaches together the hydraulic cylinder and truck can be removed;

removing the mechanical coupling;

detaching the hydraulic cylinder from the truck;

lifting the dump body with the hoist system whereby at least part of the weight of the dump body bearing on a coupling pin is removed;

removing the coupling pin from the dump body and the truck whereby the dump body is no longer pivotally attached to the truck;

removing the dump body from the truck;

positioning a $5^{th}$ wheel onto mounting brackets;

releaseably attaching the $5^{th}$ wheel to the mounting brackets; and coupling the trailer body to the $5^{th}$ wheel whereby the dump trailer body is attached to the truck.

2. The method of claim 1 wherein at least part of the weight of the dump body is bearing on the coupling pin during the step of removing the mechanical coupling.

* * * * *